H. O. MAINZINGER.
DRIVER'S FOOT REST FOR TRACTORS.
APPLICATION FILED JULY 23, 1921.
1,404,454. Patented Jan. 24, 1922.
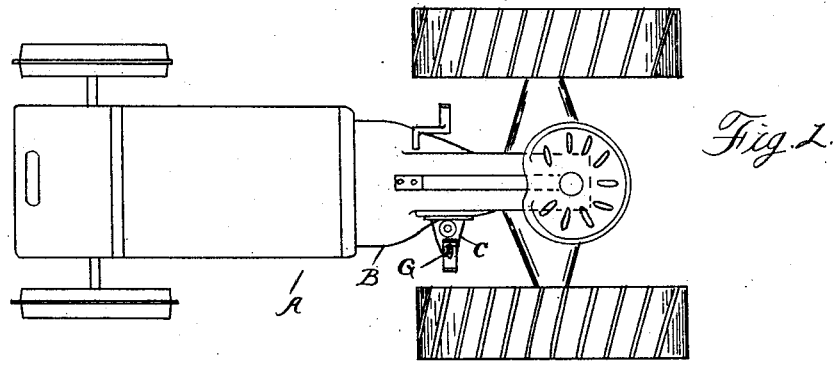
Fig. 1.
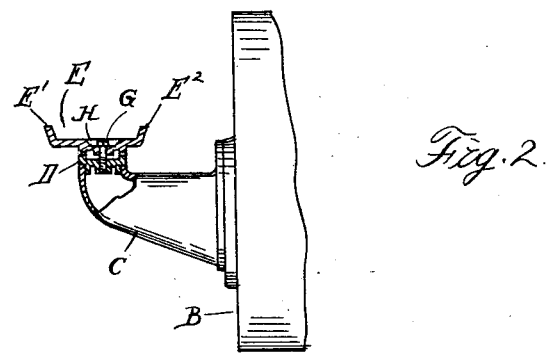
Fig. 2.
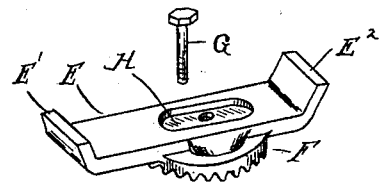
Fig. 3.
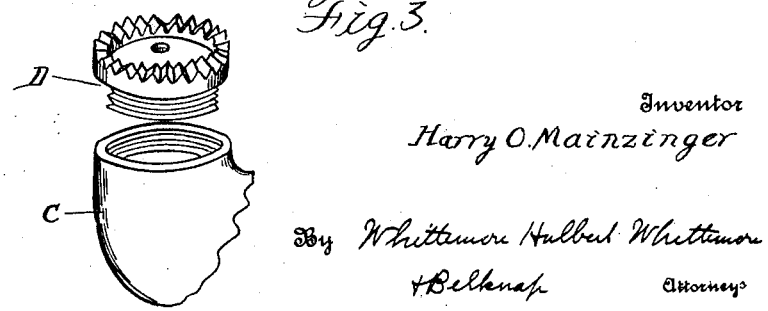
Inventor
Harry O. Mainzinger
By Whittemore Hulbert Whittemore
& Belknap
Attorneys

UNITED STATES PATENT OFFICE.

HARRY O. MAINZINGER, OF DETROIT, MICHIGAN.

DRIVER'S FOOT REST FOR TRACTORS.

1,404,454.  Specification of Letters Patent.  Patented Jan. 24, 1922.

Application filed July 23, 1921. Serial No. 487,161.

*To all whom it may concern:*

Be it known that I, HARRY O. MAINZINGER, a citizen of the United States of America, residing at Detroit, in the county of Wayne and State of Michigan, have invented certain new and useful Improvements in Drivers' Foot Rests for Tractors, of which the following is a specification, reference being had therein to the accompanying drawings.

The invention relates to tractors and more particularly to tractors of the Fordson type, and the invention consists in the construction of a combined cap and foot-rest as hereinafter set forth.

In the drawings:

Figure 1 is a plan view of a tractor to which my invention is applied;

Figure 2 is a sectional end elevation;

Figure 3 is a perspective view of the several parts of my attachment disengaged from each other.

In the operation of tractors of the type above described the operator uses his feet for actuating the controls as well as his hands. There are, however, times when both feet are not required on the control pedals and to avoid fatigue it is desirable to have a rest for the unemployed foot. The transmission housing is usually provided with a capped inlet through which lubricant may be introduced when necessary. This is so located as to be in a convenient position for a foot-rest and I have therefore constructed a cap which will perform this additional function.

In detail, A is the tractor, B the transmission housing and C the projection from said housing in which the lubricant filler opening is located. D is a threaded cap for closing the opening C. E is a foot-rest bearing which is secured to the cap D to extend laterally therefrom, being provided at its opposite ends with the upturned portions E' and E² for holding the foot from slipping off. The member E is rotatively adjustably secured to the cap D, which permits of screwing the cap to its seat and then adjusting the rest to extend in the proper direction. Preferably, the cap D has a circular top portion which is serrated or notched to engage a correspondingly notched or serrated circular base F on the member E. The two parts are then held together by a clamping screw G, the head of which engages a recess H in the member E.

With the construction described the foot-rest may be attached to any of the standard tractors by merely substituting a cap for the filler with the member E attached thereto.

What I claim as my invention is:

1. In a tractor, the combination with the transmission housing and lubricant filler therefor, of a cap for said filler constituting a foot rest.

2. In a tractor, the combination with the transmission housing and a filler therefor, of a cap for said filler, and a foot-rest secured to said cap.

3. In a tractor, the combination with the transmission housing and a lubricant filler therefor, of a cap for said filler having a threaded engagement therewith, and a foot-rest secured to said cap and rotatively adjustable thereon.

4. In a tractor, the combination with the transmission housing and a filler therefor, of a cap for said filler having a threaded engagement therewith, a foot-rest secured to said cap, and a notched or serrated bearing for said foot-rest on said cap permitting of adjusting the same rotatively with respect to the cap.

5. In a tractor, the combination with the transmission housing and a lubricant filler therefor, of a cap for said filler having a threaded engagement therewith, the upper face of said cap being circular and being notched adjacent to the periphery, a foot-rest having a corresponding circular notched portion, and a clamping screw for securing the notched portion of said foot-rest in locked engagement with said cap.

In testimony whereof I affix my signature.

HARRY O. MAINZINGER.